(12) United States Patent
Harrebek et al.

(10) Patent No.: US 12,520,270 B2
(45) Date of Patent: Jan. 6, 2026

(54) FREQUENCY REFERENCE ADJUSTMENT COMPENSATION FOR POSITIONING

(71) Applicant: NOKIA TECHNOLOGIES OY, Espoo (FI)

(72) Inventors: Johannes Harrebek, Aalborg (DK); Benny Vejlgaard, Gistrup (DK); Ryan Keating, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 301 days.

(21) Appl. No.: 18/256,233

(22) PCT Filed: Nov. 25, 2021

(86) PCT No.: PCT/FI2021/050807
§ 371 (c)(1),
(2) Date: Jun. 7, 2023

(87) PCT Pub. No.: WO2022/123109
PCT Pub. Date: Jun. 16, 2022

(65) Prior Publication Data
US 2024/0023051 A1    Jan. 18, 2024

(30) Foreign Application Priority Data

Dec. 8, 2020    (FI) .................................. 20206264

(51) Int. Cl.
*H04L 1/00* (2006.01)
*H04L 5/00* (2006.01)
*H04W 64/00* (2009.01)

(52) U.S. Cl.
CPC ........... *H04W 64/00* (2013.01); *H04L 5/0051* (2013.01)

(58) Field of Classification Search
CPC .. H04B 7/1851; H04W 56/00; H04W 52/028; H04W 52/0229; H04W 56/0045;
(Continued)

(56) References Cited

U.S. PATENT DOCUMENTS 7,299,024 B2    11/2007  Bloebaum et al.
9,621,289 B2    4/2017   Tavildar et al.
(Continued)

FOREIGN PATENT DOCUMENTS

AU    2016 298 501 A1    1/2018
EP    1 334 578 B1       8/2010
(Continued)

OTHER PUBLICATIONS

"3rd Generation Partnership Project; Technical Specification Group Radio Access Network; NR; Physical layer procedures for data (Release 16)", 3GPP TS 38.214 v16.3.0, (Sep. 2020), 166 pages.
(Continued)

*Primary Examiner* — Phuoc H Doan
(74) *Attorney, Agent, or Firm* — ALSTON & BIRD LLP

(57) ABSTRACT

According to an aspect, there is provided an apparatus for a first terminal device. The apparatus is configured to perform the following. The apparatus transmits (301) a first uplink reference signal at a first transmission time instance measured according to a local reference clock of the first terminal device. The apparatus applies (302) a frequency shift to a frequency of the local reference clock at a frequency-shift time instance measured according to the local reference clock and following the first transmission time instance. Based on the first transmission time instance, a second transmission time instance for an upcoming transmission of a second uplink reference signal, the frequency shift and the frequency-shift time instance, the apparatus calculates (303) a shift of transmission timing for the
(Continued)

upcoming transmission. The apparatus applies (304) the shift of transmission timing to the second transmission time instance and thereafter transmits (305) the second uplink reference signal at the second time instance.

19 Claims, 8 Drawing Sheets

(58) Field of Classification Search
CPC . H04W 64/00; H04W 84/06; H04W 56/0015; G01S 5/021; H04L 5/0051; H04L 5/001
See application file for complete search history.

(56) References Cited

U.S. PATENT DOCUMENTS

| | | | |
|---|---|---|---|
| 9,648,573 | B2 | 5/2017 | Siomina et al. |
| 10,285,153 | B2 | 5/2019 | Kim |
| 2009/0225662 | A1 | 9/2009 | Tsai et al. |
| 2020/0112867 | A1 | 4/2020 | Opshaug et al. |
| 2020/0374728 | A1* | 11/2020 | Manolakos ........... H04W 24/10 |
| 2022/0166531 | A1* | 5/2022 | Ren ................... H04W 56/0035 |

FOREIGN PATENT DOCUMENTS

| | | |
|---|---|---|
| WO | WO 2017/019220 A1 | 2/2017 |
| WO | WO 2020/035153 A1 | 2/2020 |
| WO | WO 2020/074747 A1 | 4/2020 |
| WO | WO 2020/186959 A1 | 9/2020 |

OTHER PUBLICATIONS

"3rd Generation Partnership Project; Technical Specification Group Services and System Aspects; Service requirements for the 5G system; Stage 1 (Release 16)", 3GPP TS 22.261 v16.13.0, (Sep. 2020), 69 pages.

"3rd Generation Partnership Project; Technical Specification Group Services and System Aspects; Study on Communication for Automation in Vertical Domains (Release 16)", 3GPP TR 22.804 v16.3.0, (Jul. 2020), 197 pages.

"5G; NG Radio Access Network (NG-RAN); Stage 2 Functional Specification of User Equipment (UE) Positioning in NG-RAN (3GPP TS 38.305 version 16.1.0 Release 16)", ETSI TS 138 305 v16.1.0, (Jul. 2020), 117 pages.

"LabVIEW Communications LTE Application Framework 2.0 and 2.0.1", Retrieved via the Internet on Jul. 9, 2020, URL: <https://www.ni.com/en-in/support/documentation/supplemental/16/labview-communications-lte-application-framework-2-0-and-2-0-1.html>, (Apr. 3, 2020), 64 pages.

Ericsson, "Introduction of NR Positioning Support", 3GPP TSG-RAN WG1 Meeting #99, Change Request CR 0029, R1-1913661, (Nov. 18-22, 2019), 11 pages.

Extended European Search Report for European Application No. 21902767.9 dated Apr. 22, 2024, 6 pages.

Intel Corporation et al., "New WID: NR Positioning Support", 3GPP TSG RAN Meeting #83, RP-190752, (Mar. 18-21, 2019), 6 pages.

International Search Report and Written Opinion for Patent Cooperation Treaty Application No. PCT/FI2021/050807 dated Feb. 28, 2022, 17 pages.

Office Action for Finland Application No. 20206264 dated Aug. 3, 2021, 11 pages.

Qualcomm Incorporated, "New SID on NR Positioning Enhancements", 3GPP TSG RAN Meeting #86, RP-193237, (Dec. 9-12, 2019), 4 pages.

Huang et al., "A Detection Algorithm of Frequency Jumps for GNSS Satellite Clocks", 2013 Joint European Frequency and Time Forum & International Frequency Control Symposium (EFTF/IFC), (Jul. 21-25, 2013), 4 pages.

Intention to Grant for European Application No. 21902767.9 dated Jan. 20, 2025, 55 pages.

* cited by examiner

FREQUENCY REFERENCE ADJUSTMENT COMPENSATION FOR POSITIONING

CROSS-REFERENCE TO RELATED APPLICATIONS

This application is a national phase entry of International Application No. PCT/FI2021/050807, filed Nov. 25, 2021, which claims priority to Finnish Application No. 20206264, filed Dec. 8, 2020, the contents of which are hereby incorporated by reference in their entirety.

TECHNICAL FIELD

The invention relates to communications.

BACKGROUND

The fifth generation cellular systems (5G) aim to improve the throughput by a huge factor (even up to 1000 or more), which provides a multitude of challenges, especially considering the scarcity of spectrum at low frequency bands and the need for supporting a very diverse set of use cases. In order to reach this goal, it is important to exploit the higher frequencies such as millimeter wave frequencies in addition to the more conventional lower frequencies. To meet the demands of 5G systems, a new, globally standardized radio access technology known as New Radio (NR) has been proposed. One proposed feature of the New Radio technology is the native support for positioning using said higher frequencies. Due to the use of higher frequencies than conventionally used for positioning, 5G NR positioning solutions are intrinsically more sensitive to any drift of the reference clock. In other words, even small timing errors may result in considerable decrease in positioning accuracy. Thus, new solutions are needed for such 5G NR positioning systems in order to maintain high positioning accuracy.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which FIG. 1 illustrate a wireless communication scenario to which embodiments may be applied.

DETAILED DESCRIPTION OF SOME EMBODIMENTS

Figure 1:
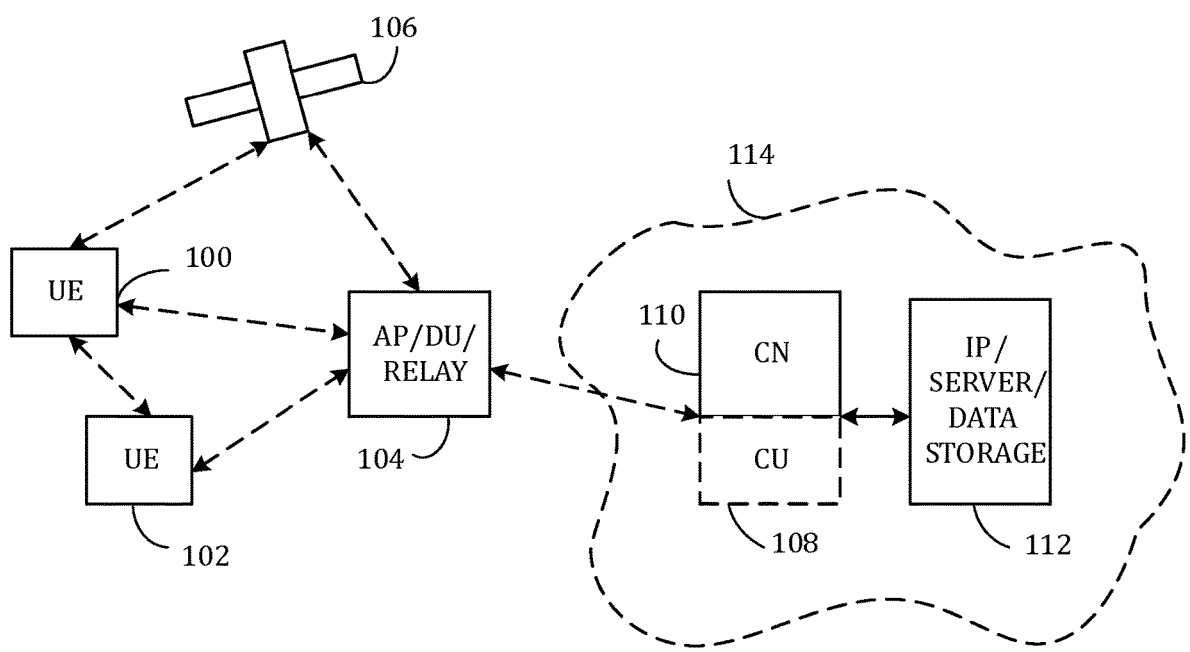

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

In the following, the relative time of arrival (RTOA) may be defined as the beginning of a particular subframe containing a sounding reference signal (SRS) received in an access node, measured relative to a configurable reference time. The reference point for the relative time of arrival shall be an antenna connector (or specifically a reception antenna connector) of the access node.

In the following, the reference signal time difference (RSTD) may be defined as a relative timing difference between a neighbour cell j and a reference cell i, defined as $RSTD = T_{SubframeRxj} - T_{SubframeRxi}$, where: $T_{SubframeRxj}$ is the time when the terminal device receives the start of one subframe from cell j and $T_{SubframeRxi}$ is the time when the terminal device receives the corresponding start of one subframe from cell i that is closest in time to the subframe received from cell j. The reference point for the observed subframe time difference may specifically be the antenna connector of the terminal device.

In the following, the observed time difference of arrival (OTDOA) is defined as the time interval that is observed by a terminal device (using a local reference clock of the terminal device) between the reception of downlink signals from two different access nodes (or cells). The OTDOA may correspond to the RSTD. In some instances, the observed time difference of arrival (OTDOA) may be called simply the time difference of arrival (TDOA).

In the following, reception-transmission (RX-TX) delay of an apparatus (e.g., a terminal device or an access node) may be defined as a delay between a reception of a first signal in an apparatus and a subsequent transmission of a second signal (associated with the first signal) by said apparatus. The first signal may be received from the same apparatus to which the second signal is transmitted.

In the following, the round-trip time (RTT) may be defined as the duration from transmitting a signal to reception of a response to that signal. This time delay includes the propagation times for the paths between the two communication endpoints (in embodiments specifically, an access node and a terminal device). In embodiments, the signal and the response may be specifically a positioning reference signal (transmitted by an access node) and a sounding reference signal (received by the access node), respectively.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned above, one suggested feature of the future 5G communications systems is the so-called 5G New Radio. 5G New Radio refers to a new global 5G standard for an orthogonal frequency-division multiplexing (OFDM)-based air interface designed to fit the more stringent requirements of the 5G systems (for example, providing different types of services to a huge number of different types of devices operating over a wide frequency spectrum).

One of the features proposed for 5G New Radio is the support for positioning using centimeter and millimeter waves such as the so-called frequency range 1 (FR1) and frequency range 2 (FR2). Specifically, at least the following positioning solutions have been suggested for 5G NR:
- Downlink Time Difference of Arrival (DL-TDOA) positioning,
- Uplink Time Difference of Arrival (UL-TDOA) positioning,
- Downlink Angle of Departure (DL-AoD) positioning,
- Uplink Angle of Arrival (UL-AoA) positioning and
- Multi-cell Round Trip Time (Multi-RTT) positioning.

The solutions enable both RAT dependent (for both FR1 and FR2) and RAT independent NR positioning techniques. In the downlink direction, a new positioning reference signal (PRS) has been introduced while, in the uplink direction, a new sounding reference signal (SRS) for positioning (abbreviated as SRS-P) has been introduced. In the case of DL-TDOA the terminal device makes reference signal time difference (RSTD) measurements on PRS from multiple access nodes in order to facilitate multilateration and estimate the location of the target. RSTD measurements typically use a single access node or PRS as the reference for measurements of all the additional cells.

The embodiments relate to reference clocks of terminal devices. The reference clock of a terminal device may be used for implementing many different applications of the terminal device such as the Global Navigation Satellite System (GNSS) functionalities and the multi RAT cellular modems. Prior to integrating the GNSS functionalities into the terminal device, the reference clock was implemented as a voltage controlled temperature compensated crystal oscillator (VCTCXO), a temperature compensated crystal oscillator (TCXO) or a crystal oscillator depending on the needed clock accuracy. In such solutions, it was common practice to adjust the reference clock in a closed-loop mode to always have the needed clock accuracy (e.g., 0.1 ppm). However, in solutions where the GNSS functionalities are implemented in the terminal device and the same clock is used as reference for all supported applications, it is no longer possible to adjust the reference clock on the fly as any changes in the clock frequency during the GNSS operation would create inaccuracies in the GNSS positioning. Such inaccuracies may be especially fatal for 5G NR positioning systems using centimeter or millimeter frequencies (i.e., higher frequencies than many previous positioning systems) and being thus more sensitive to timing errors in positioning.

Figure 2:
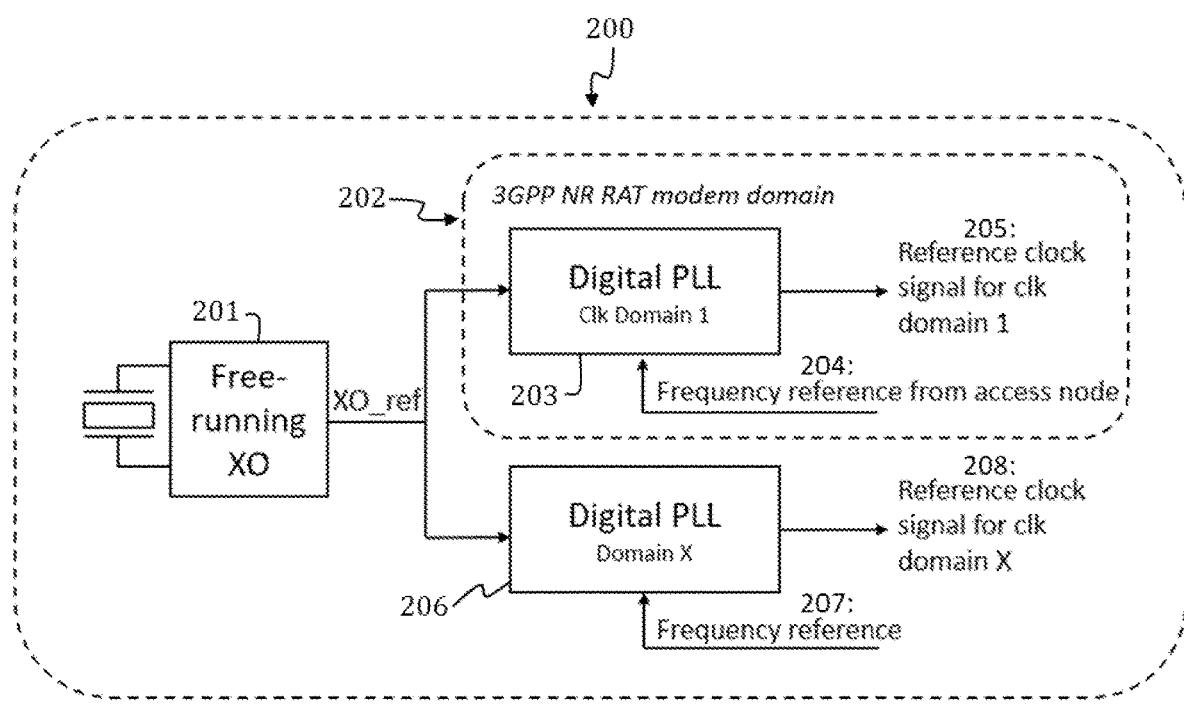
FIG. 2 illustrates a phase-locked loop of a terminal device according to embodiments.

FIG. 2 shows a simplified presentation of an exemplary phase-locked loop arrangement or system 200 used for deriving at least one reference clock signal 205, 208 of the terminal device. The illustrated PLL arrangement may be comprised in a terminal device or specifically in either of the terminal devices 100, 102 of FIG. 1.

Referring to FIG. 2, the PLL arrangement 200 for generating at least one reference clock signal 205, 208 of a terminal device comprises a free-running crystal oscillator (XO) 201 (which may exhibit dynamic frequency drift). The free-running crystal oscillator 201 is configured to provide a frequency reference (XO_ref) to at least two digital phase-locked loops 203, 206.

One 203 of the digital phase-locked loops 203, 206 may correspond specifically to 3GPP NR RAT modem domain 202 (a clock domain 1). When the baseline is a free running crystal oscillator 201, the reference clock frequency (XO_ref) will drift in between adjustments made with reference to the frequency reference of a serving access node of the terminal device. To counter this drift in the digital phase-locked loop 203, when downlink data is received from the serving access node of the terminal device comprising the PLL arrangement 200, a frequency shift $\Delta f$ between the reference frequency of the free-running crystal oscillator 201 (XO_ref) and the reference frequency of the serving access node 204 is calculated and added to the reference frequency of the free-running crystal oscillator 201 to form the (output) reference clock signal 205 for clock domain 1. As long as the downlink connection is active, the modem reference clock of the terminal device (i.e., the reference clock formed effectively of elements 201, 203) is in sync with the serving access node even though the free running frequency reference XO_ref provided by the crystal oscillator 201 is drifting. In other words, in order to keep synchronized with the wireless communications network, a terminal device needs to frequently correct the reference frequency (XO_ref) provided by the XO-based reference clock 201 based on the frequency reference 204 of the serving access node. These corrections or updates may specifically take effect at slot boundaries to avoid any issues with phase discontinuities. The frequency adjustments of the reference clock of the terminal device may happen both during downlink reception and uplink transmission. Moreover, they may be performed whenever enough downlink statistics have been collected. Said adjustments may happen in one step with little or no filtering to support fast adjustments.

In addition to the digital phase-locked loop 203 corresponding to the 3GPP NR RAT modem domain 202, the free-running crystal oscillator may provide the frequency reference to one or more other digital phase-locked loops 206 corresponding to other clock domains. Said one or more other digital phase-locked loops 206 may operate similar to as described for the digital phase-locked loop 203 of the 3GPP NR RAT modem domain though the frequency reference 207 fed into the digital phase-locked loop 206 may be different from the frequency reference 204 received from the serving access node and thus different frequency shift may be applied in the phase-locked loop of clock domain X to free-running frequency reference XO_ref.

The accuracy of the clock frequency of the terminal device and the associated needed update rate for the clock frequency of the terminal device depend on the operating condition (or operating mode) of the terminal device. The operating condition of the terminal device may be, at any given time, one of sleep, idle and Radio Resource Control (RRC) connected. For example, in the RRC connected state, the maximum uplink clock frequency error of the terminal device may be 0.1 ppm.

During any temporary loss of downlink signal, any adjustment of the reference clock of the terminal device is only approximate and therefore the frequency offset between downlink slots or uplink slot of up to 0.1 ppm are not unlikely which correspond to 30 cm (10 ms frame referred) of positioning error. Since the 0.1 ppm specification refers to terminal device uplink transmissions during downlink only operation, the frequency offset may even be higher due to reception gaps or if the terminal device selects a slower adjustment rate.

Any positioning schemes where the accuracy is impacted by a reference clock frequency adjustment or drift in-between downlink measurements or uplink transmissions are problematic in regard to minimizing positioning error. Such RRC connected problem scenarios comprise:

- DL-TDOA with reference clock frequency adjustment/drift between sequentially scheduled PRS reception from different access nodes (here, PRS may be received in different subframes from different access nodes due to PRS repetition, PRS beam sweeping, or PRS muting),
- DL-TDOA with reference clock frequency adjustment/drift between sequential receptions on multiple antenna array (or antenna panels) or sequential beamformed receptions on a single antenna array (or antenna panel) of the terminal device,
- UL-TDOA with reference clock frequency adjustment/drift between sequentially scheduled SRS-P transmissions to different access nodes,
- UL-TDOA with reference clock frequency adjustment/drift between sequential transmissions on multiple antenna arrays of the terminal device or sequential beamformed transmissions on a single UE antenna panel,
- multi-RTT with reference clock frequency adjustment/drift between DL PRS and UL SRS-P which will impact the time difference between the receiver and the transmitter and/or
- use of Enhanced 911 (E911) service in coverage limited areas (e.g., rural areas) where the PRS transmissions may need to be repeated several times to obtain adequate statistics for reporting the reference signal time difference (RSTD) measurements and, depending on PRS periodicity and timing of terminal device reference clock adjustments, positioning errors may be several meters if not corrected.

The embodiments discussed below in detail provide a local procedure of the terminal device for compensating for the aforementioned problems relating to local terminal device reference clock frequency adjustments and thereby increasing the positioning measurement accuracy.

Figure 3:
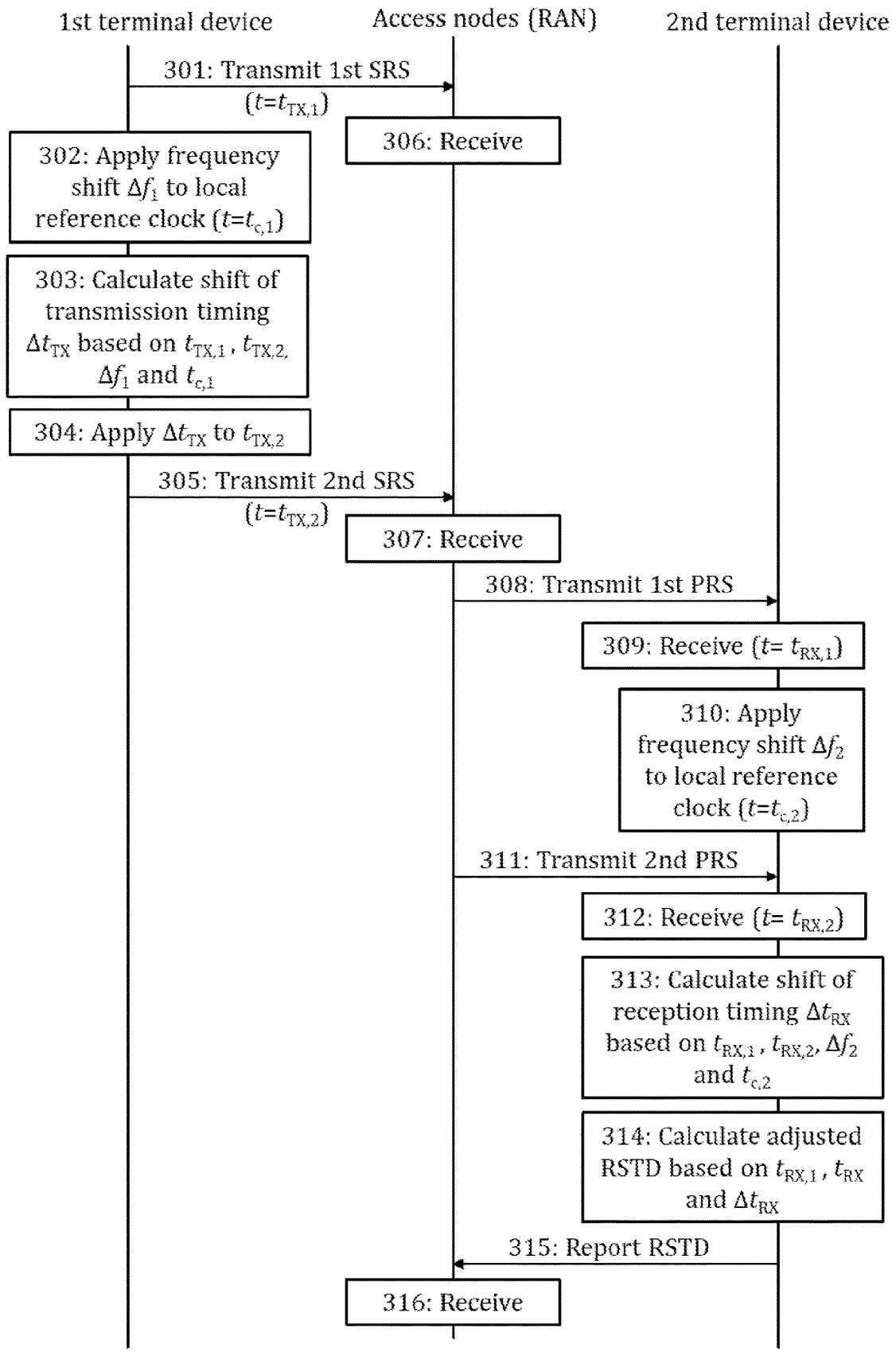
FIGS. 3 to 5, 6A and 6B illustrate processes according to embodiments.

FIG. 3 illustrates processes according to embodiments for adjusting transmission or reception timing in a terminal device to take into account any local frequency reference adjustments. Specifically, FIG. 3 illustrates functionalities of a first terminal device, a second terminal device and access nodes of a radio access network serving both the first and second terminal devices and signaling between them. Said access nodes may comprise a serving access node of the first and second terminal device (which may be the same access node) and/or one or more neighboring access nodes to said serving access node (or nodes). The first terminal device and/or the second terminal device may correspond to either of terminal devices 100, 102 of FIG. 1. The access nodes may correspond to the access node 104 of FIG. 1. In some embodiments, the functionalities of the first terminal device, the second terminal device and the access nodes may be carried out by a certain subunit of the first terminal device, the second terminal device and the access node, respectively.

FIG. 3 illustrates effectively two separate processes performed by first and second terminal devices: a first process for uplink timing adjustment functionality comprising elements 301 to 307 and a second process for downlink timing adjustment functionality comprising elements block 308 to 316. In some embodiments, only one of said first and second processes may be implemented. In other embodiments, a single terminal device may be configured for carrying out both the first and second processes.

Each of the first and second terminal devices comprise a local reference clock which may be synchronized with a reference clock of the serving access node of the respective one of the first and second terminal devices. The local reference clocks may be based on, for example, free-running crystal oscillators as described above. Specifically, the first and/or second terminal device may comprise a phase-locked loop 200 used for deriving a reference clock signal as discussed in connection with FIG. 2.

Moreover, it may initially be assumed that the first terminal device is configured to perform at least two sequential sounding reference signal (SRS) transmissions (i.e., transmission of a first and a second sounding reference signal). In general, a sounding reference signal (SRS) is a reference signal transmitted by a terminal device in the uplink direction and which may be used by the access node(s) to estimate the uplink channel quality over a wider bandwidth. The sounding reference signals as discussed here may be specifically used for positioning.

Similarly, it may be assumed that the second terminal device is configured to perform at least two sequential positioning reference signal (PRS) receptions (i.e., reception of a first and a second positioning reference signal). In general, a positioning reference signals are downlink reference signal used commonly, e.g., in Observed Time Difference of Arrival (OTDOA) based positioning for determining positions of terminal devices. Specifically, the position of a terminal device may be calculated based on measurements of reference signal time difference measurements (i.e., measured time difference of arrival of the PRS from a serving cell and one or more neighboring cells), the absolute or relative transmission timing of each cell, and the known physical position(s) of the access nodes for the serving and neighboring cells.

In some embodiments, the first and second terminal devices may be configured to perform periodic transmission of sounding reference signals and periodic reception of positioning reference signals, respectively.

First, the first terminal device transmits, in message 301, a first sounding reference signal (SRS) at a first transmission time instance $t_{TX,1}$. Here, the first transmission time instance $t_{TX,1}$ is specifically measured according to the local reference clock of the first terminal device. Here and in the following, a transmission time instance may be equally called a time of delivery (TOD). The first sounding reference signal may be transmitted to a first access node (e.g., the serving or neighboring access node) or to a plurality of first access nodes.

At least one access node receives, in block 306, the first sounding reference signal. Subsequently, the first sounding reference signal may be employed for positioning. This may involve, e.g., calculating a relative time of arrival (RTOA) for the first sounding reference signal, as will be discussed in more detail in connection with FIG. 4.

In some embodiments, elements 301, 306 may be omitted.

Following the first transmission time instance, the first terminal device applies, in block 302, a first frequency shift $\Delta f_1$ to a frequency $f_1$ of the local reference clock at a first frequency-shift time instance $t_{c,1}$ measured according to the local reference clock of the first terminal device. In other words, the first terminal device adjusts the frequency of the local reference clock so that the adjusted frequency has the value of $f_1 + \Delta f_1$. The first terminal device may store information on the first frequency shift $\Delta f_1$ and the first frequency-shift time instance $t_{c,1}$ to a memory of the first terminal device. Similar to as described above, the first frequency shift $\Delta f_1$ may be carried out in order to ensure synchronization of the local reference clock with the reference clock of the serving access node despite of any drift of the local reference clock of the first terminal device. The first frequency-shift time instance $t_{c,1}$ may correspond to a slot boundary to avoid any issues with phase discontinuities.

The extent of the first frequency shift $\Delta f_1$ in block 302 (and any frequency shift in any of the following embodiments) may be determined using any known method such as, by correlation on the downlink reference channel. In the following, one exemplary method is described. Initially, the frequency is estimated using known downlink reference symbols. This way the terminal device knows what should be received as the symbols transmitted are known to the terminal device. Then, the terminal device is able to compare the expected symbol with the received symbol and estimate the difference which includes the frequency shift $\Delta f$. The frequency shift estimation is done by cross correlation between the received and the transmitted symbols. As a second step, similar estimation is performed on the received user data. The symbols of such data are not known. Therefore, the terminal device estimates the received symbols based on its approximate frequency offset and then based on the estimated symbols, the terminal device is able to calculate the frequency offset as in the initial step.

The first terminal device calculates, in block 303, a shift of transmission timing $\Delta t_{TX}$ for an upcoming transmission of a second sounding reference signal to compensate for the first frequency shift $\Delta f_1$ based on the first transmission time instance $t_{TX,1}$, a second transmission time instance $t_{TX,2}$ (or equally a second TOD) scheduled using the local reference clock of the first terminal device for the upcoming transmission of the second sounding reference signal, the first frequency shift $\Delta f_1$ and the first frequency-shift time instance $t_{c,1}$ (or at least some of them). In some embodiments, the calculation in block 303 may be based at least on the first frequency-shift time instance $t_{c,1}$ and the second transmission time instance $t_{TX,2}$ (or alternatively the time difference between $t_{c,1}$ and $t_{TX,2}$) and the first frequency shift $\Delta f_1$. The first terminal device may store information on the shift of transmission timing $\Delta t_{TX}$ to a memory of the first terminal device.

The first terminal device applies, in block 304, the shift of transmission timing $\Delta t_{TX}$ to the second transmission time instance $t_{TX,2}$. In other words, the first terminal device calculates a new (shifted) value for the second transmission time instance as $t_{TX,2}+\Delta t_{TX}$. The first terminal device may store information on the resulting shifted second transmission time instance $t_{TX,2}+\Delta t_{TX}$ to a memory of the first terminal device.

The first terminal device transmits, in message 305, the second sounding reference signal at the second time instance having the shifted value $t_{TX,2}+\Delta t_{TX}$ (or equally second shifted TOD). The second sounding reference signal may be transmitted to a second access node (e.g., a serving or neighboring access node) or to a plurality of second access nodes. In some embodiments, the first and second sounding reference signals may be transmitted at least to first and second access nodes, respectively. In other embodiments, both the first and second sounding reference signals may be transmitted at least to the first access node. This may occur, for example, if SRS retransmissions are required due to poor coverage or if transmissions are to be carried out subsequently using multiple different beams formed by one or more antenna arrays of the first terminal device.

The second sounding reference signal is received, in block 307, by said at least one access node. Due to the shift of the transmission timing applied in block 304, the shifted time instance associated with the transmission of the second sounding reference signal now matches the expected transmission time of the second sounding reference signal as defined in said at least one access node/RAN. Therefore, it is possible to determine the distance between the first terminal device and said at least one access node based on the delay (i.e., relative time of arrival, RTOA) between the transmission of the second sounding reference signal by the first terminal device and the reception of the second sounding reference signal in the at least one access node accurately. By combining multiple RTOA measurements of the first terminal device, e.g., in a location management function (LMF) or other core network element, the accurate positioning of the first terminal device is enabled.

In some embodiments, the first terminal device may be configured to perform beamforming at least in transmission using one or more antenna arrays. In such embodiments, the first terminal device may be configured to transmit the first sounding reference signal to one or more first access nodes using a first beam and to transmit the second sounding reference signal to said one or more first access nodes or one or more second access nodes using a second beam. The one or more second access nodes may be at least partly different from the one or more first access nodes.

As described above, elements 308 to 316 describe a second process providing downlink timing adjustment functionality (as opposed to uplink timing adjustment functionality). Said second process is initiated by a third access node transmitting, in message 308, a first positioning reference signal (PRS) to a second terminal device. The third access node may be, e.g., a serving access node of the second terminal device or a neighboring access node to that serving access node. The third access node may or may not be the same access node as any of the first or second access nodes described above.

The second terminal device receives, in block 309, the first positioning reference signal. Specifically, the first positioning reference signal is received at a first reception time instance $t_{RX,1}$ measured according to a local reference clock of the second terminal device. Here and in the following, a reception time instance may be equally called a time of arrival (TOA). The second terminal device may store information on the first positioning reference signal and a first reception time instance $t_{RX,1}$ to a memory of the second terminal device The second terminal device applies, in block 310, a second frequency shift $\Delta f_2$ to a frequency of the local reference clock at a second frequency-shift time instance $t_{c,2}$. Here, the second frequency-shift time instance $t_{c,2}$ is defined according to the local reference clock of the second terminal device. The second frequency-shift time instance $t_{c,2}$ follows the first reception time instance $t_{RX,1}$, as illustrated in FIG. 3. The second terminal device may store information on the second frequency shift $\Delta f_2$ and the second frequency-shift time instance $t_{c,2}$ to a memory of the second terminal device.

A fourth access node (being, e.g., a neighboring access node) transmits, in message 311, a second positioning reference signal to the second terminal device. The fourth access node may specifically transmit the second positioning reference signal (substantially) at the same time as the third access node transmits the first positioning reference signal (message 308) so as to enable OTDOA positioning of the second terminal device. In some cases, an offset in the timing of the transmission of the first and second positioning reference signals (messages 308, 311) may exist. The effect of such an offset may be eliminated when calculating the position of the second terminal device in the LMF. The fourth access node may be located physically farther from the second terminal device compared to the third access node causing the second positioning reference signal to be received later than the first positioning reference signal in the second terminal device. The third and fourth access nodes may be synchronized to the same clock reference.

In other embodiments, both the first and second positioning reference signals may be transmitted by the third access node. This may occur, for example, if PRS retransmissions are required due to poor coverage (e.g., PRS transmissions may need to be repeated several times to obtain adequate statistics for reporting the RSTD measurements) or if reception is to be carried out subsequently using multiple different beams formed by one or more antenna arrays of the second terminal device.

The second terminal device receives, in block 312, the second positioning reference signal at a second reception time instance $t_{RX,2}$ (or a second TOA) measured according to the local reference clock of the second terminal device. Upon reception, the second terminal device may store information on the second positioning reference signal and/or a second reception time instance $t_{RX,2}$ to a memory of the second terminal device.

The second terminal device calculates, in block 313, a shift of reception timing $\Delta t_{RX}$ for the reception of the second positioning reference signal to compensate for the frequency shift based on the first reception time instance $t_{RX,1}$, the second frequency shift $\Delta f_2$, the second frequency-shift time instance $t_{c,2}$ and the second reception time instance $t_{RX,2}$ (or at least some of them). In some embodiments, the first reception time instance $t_{RX,1}$ may not be used in the calculation in block 313. The second terminal device may store information on the shift of reception timing $\Delta t_{RX}$ to a memory of the second terminal device.

The second terminal device calculates, in block 314, an adjusted reference signal time difference (RSTD) based on the first and second reception time instances $t_{RX,1}$ and $t_{RX,2}$ and the shift of reception timing $\Delta t_{RX}$. Specifically, this calculation may comprise, first, calculating a reference signal time difference (RSTD) based on the first and second reception time instance $t_{RX,1}$ and $t_{RX,2}$ and, second, applying the shift of reception timing $\Delta t_{RX}$ to the RSTD. In other words, the adjusted RSTD may be calculated as $(t_{RX,2}-t_{RX,1})+\Delta t_{RX}$. The RSTD may be equally called a time difference of arrival (TDOA) or observed time difference of arrival (TDOA). The second terminal device may store information on the resulting shifted RSTD and/or on the non-shifted RSTD to a memory of the second terminal device.

The second terminal device reports, in message 315, the adjusted RSTD to at least one access node (e.g., the third and/or fourth access node). Subsequently, the adjusted RSTD may be used for OTDOA positioning. Based on multiple reported adjusted RSTDs, the exact location of the second terminal device may be determined, as described in more detail in connection with FIG. 5.

In some embodiments, the second terminal device may be configured to perform beamforming at least in reception using one or more antenna arrays. In such embodiments, the second terminal device may be configured to receive the first positioning reference signal from a third access node using a first beam and to receive the second positioning reference signal from one of said third access node and a fourth access node using a second beam.

Figure 4:
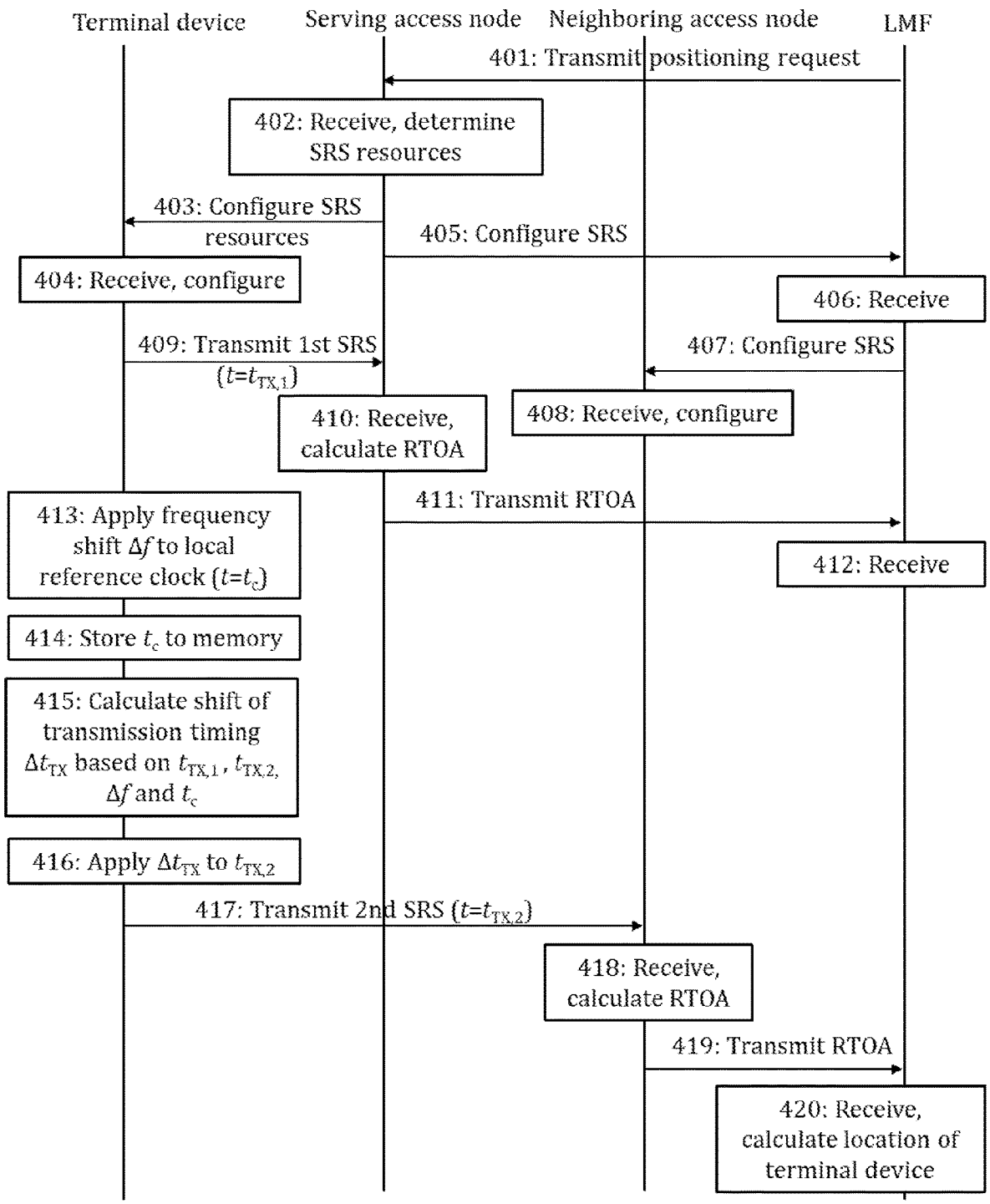

FIG. 4 illustrates detailed processes according to embodiments for adjusting transmission timing in a terminal device to take into account any local frequency reference adjustments in connection with UL-TDOA positioning. FIG. 4 corresponds specifically to a more detailed embodiment of the first process (elements 301 to 307) illustrated in FIG. 3 (with the first terminal device of FIG. 3 called here simply "a terminal device"). Thus, any of the definitions provided in connection with elements 301 to 307 of FIG. 3 may apply, mutatis mutandis, for this embodiment. Specifically, FIG. 4 illustrates functionalities of a terminal device, a serving access node of a radio access network (RAN) for the terminal device, a neighboring access node of the RAN (being specifically neighboring to said serving access node) and a location management function (LMF) and signaling between them. The terminal device may correspond to either of terminal devices 100, 102 of FIG. 1. The terminal device may comprise a phase-locked loop of FIG. 2. The serving and/or neighboring access node may correspond to the access node 104 of FIG. 1. In some embodiments, the functionalities of the terminal device and the access nodes may be carried out by a certain subunit of the terminal device and the corresponding access node, respectively.

Referring to FIG. 4, the LMF initially transmits, in message 401, a first positioning request to the serving access node (of the terminal device terminal device). The first positioning request may be specifically a first UL-TDOA positioning request. In some embodiments, said first UL-TDOA positioning request may be a NRPPa (NR Positioning Protocol A) message for requesting UL-SRS activation of the terminal device.

In response to receiving the first positioning request in block 402, the serving access node determines, in block 402, (uplink) sounding reference signal resources to be employed by the terminal device for transmitting at least a first and second sounding reference signals. The sounding reference signal resources may comprise frequency-domain resources (e.g., at least one bandwidth to be used for transmission) and time-domain resources (e.g., at least one subframe to be used for transmission). The serving access node transmits, in message 403, a first configuration message defining at least said sounding reference signal resources. In response to receiving the first configuration message in block 404, the terminal device configures, in block 404, itself according to said first configuration message.

In addition to configuring the terminal device according to the determined sounding reference signal resources, the serving access node transmits, in message 405, a second configuration message to the LMF. In response to receiving the second configuration message, the LMF transmits, in message 407, a third configuration message to the neighboring access node. The third configuration message may comprise information for enabling the neighboring access node to receive at least one scheduled sounding reference signal (i.e., at least a second sounding reference signal to be discussed below). The third configuration message may be, e.g., a NRPPa measurement request. Upon receiving the third configuration message in block 408, the neighboring access node configures, in block 408, itself according to the third configuration message.

After the configuration procedure discussed in connection with elements 401 to 408, the terminal device may operate, at least for the most part, as discussed in connection with elements 301 to 305 of FIG. 3. In other words, elements 409, 413, 415, 416, 417 of FIG. 4 may correspond, mutatis mutandis, to elements 301 to 305 of FIG. 3. Thus, the subsequent operation of the terminal device is discussed here only briefly for brevity.

The terminal device transmits, in message 409, a first sounding reference signal (SRS) to a serving access node at a first transmission time instance $t_{TX,1}$. Here, the first transmission time instance $t_{TX,1}$ is specifically measured according to the local reference clock of the terminal device.

In response to receiving, in block 410, the first sounding reference signal, the serving access node calculates, in block 410, a first relative time of arrival (RTOA) for the first sounding reference signal based on the received first sounding reference signal. Specifically, the first RTOA may be calculated based on the first transmission time instance $t_{TX,1}$ (which is known to the serving access node as the SRS resources were determined by the serving access node in block 402) and a first measurement time instance corresponding to a time of reception or measurement of the first sounding reference signal by the serving access node. The first measurement time instance may be measured specifically by a local reference clock of the serving access node. In other words, the serving access node calculates delay between the transmission of the first sounding reference signal by the terminal device and the reception of the first sounding reference signal in the serving access node.

The serving access node transmits, in message 411, the first relative time of arrival to the LMF. The LMF receives, in block 412, the first relative time of arrival (and possibly stores it to a memory).

Following the first transmission time instance, the terminal device applies, in block 413, a frequency shift $\Delta f$ to a frequency of the local reference clock at a frequency-shift time instance $t_c$ measured according to the local reference clock of the terminal device. The terminal device stores (or logs), in block 414, at least the frequency-shift time instance $t_c$ to a memory of the terminal device.

The terminal device calculates, in block 415, a shift of transmission timing $\Delta t_{TX}$ for an upcoming transmission of a second sounding reference signal to compensate for the frequency shift $\Delta f$ based on the first transmission time instance $t_{TX,1}$, a second transmission time instance $t_{TX,2}$ scheduled using the local reference clock of the terminal device for the upcoming transmission of the second sounding reference signal, the frequency shift $\Delta f$ and the frequency-shift time instance $t_c$ (or on at least some of them). In some embodiments, the first reception time instance $t_{RX,1}$ may not be used in the calculation in block 415. The terminal device may store information on the shift of transmission timing $\Delta t_{TX}$ to a memory of the terminal device.

The terminal device applies, in block 416, the shift of transmission timing $\Delta t_{TX}$ to the second transmission time instance $t_{TX,2}$ and transmits, in message 417, the second sounding reference signal at the (shifted) second time instance $t_{TX,2}+\Delta t_{TX}$ to the neighboring access node. As described in detail in connection with FIG. 3, in some embodiments where the terminal device is configured to perform beamforming at least in transmission, the terminal device may be configured to transmit the first sounding reference signal using a first beam and to transmit the second sounding reference signal using a second beam.

The second sounding reference signal is received, in block 418, by the neighboring access node. In response to the receiving in block 418, the neighboring access node calculates, in block 418, a second relative time of arrival (RTOA) for the second sounding reference signal based on the received second sounding reference signal. Specifically, the second RTOA may be calculated based on the second transmission time instance (which is known to the neighboring access node based on the configuration in block 408) and a second measurement time instance corresponding to a time of reception or measurement of the second sounding reference signal by the neighboring access node. The second measurement time instance may be measured specifically by a local reference clock of the neighboring access node.

The neighboring access node transmits, in message 419, the second relative time of arrival to the LMF. The LMF receives, in block 420, the second relative time of arrival (and possibly stores it to a memory). Based on the first and second relative times of arrival and locations of the serving access node and the neighboring access node which are known to the LMF (and knowing the speed at which electromagnetic wave propagate through air, i.e., speed of light in air), the LMF is able to calculate the location of the terminal device according to basic multilateration (or UL-TDOA positioning) principles.

Figure 5:
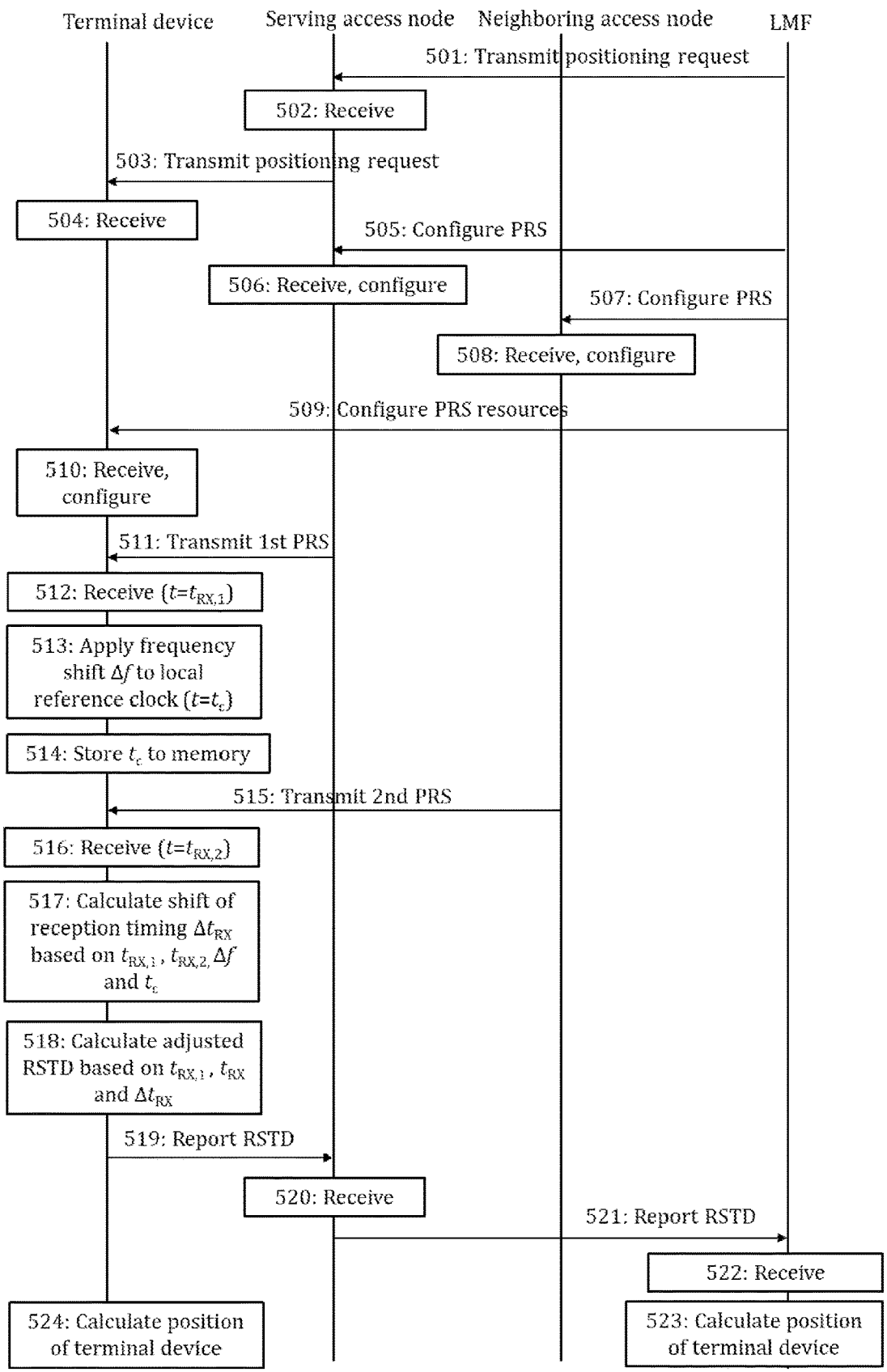

FIG. 5 illustrates detailed processes according to embodiments for adjusting transmission timing in a terminal device to take into account any local frequency reference adjustments in connection with DL-TDOA positioning. FIG. 5 corresponds specifically to a more detailed embodiment of the second process (elements 308 to 317) illustrated in FIG. 3 (with the second terminal device of FIG. 3 called here simply "a terminal device"). Thus, any of the definitions provided in connection with elements 308 to 317 of FIG. 3 may apply, mutatis mutandis, for this embodiment. Specifically, FIG. 5 illustrates, similar to FIG. 4, functionalities of a terminal device, a serving access node of a radio access network (RAN) for the terminal device, a neighboring access node of the RAN (being specifically neighboring to said serving access node) and a location management function (LMF) and signaling between them. The terminal device may correspond to either of terminal devices 100, 102 of FIG. 1. The terminal device may comprise a phase-locked loop of FIG. 2. The serving and/or neighboring access node may correspond to the access node 104 of FIG. 1. In some embodiments, the functionalities of the terminal device and the access nodes may be carried out by a certain subunit of the terminal device and the corresponding access node, respectively. The serving and neighboring access nodes may be synchronized to the same clock reference.

Referring to FIG. 5, the LMF initially transmits, in message 501, a first positioning request to the serving access node (of the terminal device terminal device). The first positioning request may be specifically a first DL-TDOA positioning request.

In response to receiving the first positioning request in block 502, the serving access node may forward, in message 503, the first positioning request to the terminal device. Correspondingly, the terminal device may receive, in block 504, the first positioning request. Elements 503, 504 may be considered optional.

The LMF transmits, in message 505, a first configuration message for configuring positioning reference signal (PRS) measurements between the serving access node and the terminal device to the serving access node. The first configuration message may define at least PRS resources to be used. Upon reception of the first configuration message in block 506, the serving access node configures, in block 506, itself according to the first configuration message (i.e., to transmit at least one PRS at at least one pre-defined time instance at least to the terminal device).

The LMF transmits, in message 507, a second configuration message for configuring positioning reference signal (PRS) measurements between the neighboring access node and the terminal device to the neighboring access node. The second configuration message may also define at least PRS resources to be used. Upon reception of the second configuration message in block 508, the serving access node configures, in block 508, itself according to the first configuration message (i.e., to transmit at least one PRS at at least one pre-defined time instance at least to the terminal device).

Finally, the LMF transmits, in message 509, a third configuration message for configuring positioning reference signal (PRS) measurements between the terminal device and the serving and neighboring access nodes to the terminal device (via the serving access node). Upon reception of the third configuration message in block 510, the terminal device configures, in block 510, itself according to the third configuration message (i.e., to receive at least one first PRS at at least one first pre-defined time instance from the serving access node and to receive at least one second PRS at at least one second pre-defined time instance from the neighboring access node).

After the configuration procedure discussed in connection with elements 501 to 510, the terminal device may operate, at least for the most part, as discussed in connection with elements 309, 310, 312 to 315 of FIG. 3. In other words, elements 512, 513, 516 to 519 of FIG. 5 may correspond, mutatis mutandis, to elements 309, 310, 312 to 315 of FIG. 3. Any associated features discussed in connection with FIG. 3 may be combined with the process of FIG. 5. Thus, the subsequent operation of the terminal device is discussed here only briefly for brevity.

Following the configuration of the terminal device, the serving access node transmits, in message 511, a first positioning reference signal (PRS) to the terminal device. The terminal device receives, in block 512, the first positioning reference signal at a first reception time instance $t_{RX,1}$ measured according to a local reference clock of the terminal device and applies, in block 513, a frequency shift $\Delta f$ to a frequency of the local reference clock at a frequency-shift time instance $t_c$ (defined according to the local reference clock). The frequency-shift time instance $t_c$ follows the first reception time instance $t_{RX,1}$, as illustrated in FIG. 5. The terminal device stores (or logs), in block 514, at least the frequency-shift time instance $t_c$ to a memory of the terminal device.

The neighboring access node transmits, in message 515, a second positioning reference signal to the terminal device. The neighboring access node may be specifically configured to transmit the second positioning reference signal (substantially) at the same time as the serving access node transmits the first positioning reference signal (message 511).

The terminal device receives, in block 516, the second positioning reference signal at a second reception time instance $t_{RX,2}$ measured according to the local reference clock of the terminal device and calculates, in block 517, a shift of reception timing $\Delta t_{RX}$ for the reception of the second positioning reference signal to compensate for the frequency shift $\Delta f$ based on the first reception time instance $t_{RX,1}$, the frequency shift $\Delta f$, the frequency-shift time instance $t_c$ and the second reception time instance $t_{RX,2}$ (or at least some of them). In some embodiments, the first reception time instance $t_{RX,1}$ may not be used in the calculation in block 516.

Then, the terminal device calculates, in block 518, an adjusted reference signal time difference (RSTD) based on the first and second reception time instances $t_{RX,1}$ and $t_{RX,2}$ and the shift of reception timing $\Delta t_{RX}$. The RSTD may be calculated as discussed in connection with block 315 of FIG. 3.

The terminal device reports, in message 519, the adjusted RSTD to the serving access node. In response to receiving the adjusted RSTD in block 520, the serving access node further reports, in message 521, the adjusted RSTD to the LMF. The LMF receives, in block 522, the adjusted RSTD. Subsequently, the adjusted RSTD may be used for OTDOA positioning.

To enable the OTDOA positioning of the terminal device, the process described with elements 501 to 522 may be repeated for at least two access nodes at least one of which is neither of the serving access node and said neighboring access node (not shown in FIG. 5). In other words, the process of elements 501 to 522 may be repeated for a pair of access nodes formed by the serving access node and another neighboring access node (i.e., not the one illustrated in FIG. 5) or by two neighboring access nodes. Based on at least two reported adjusted RSTDs, the exact location of the terminal device may be calculated in block 523 according OTDOA positioning principle.

The OTDOA positioning is based on the fact that an (adjusted) RSTD calculated for a pair of access nodes and a terminal device defines a hyperbola. When multiple such hyperbolas for the same terminal device are defined, the point at which these hyperbolas intersect defines the location of the terminal device. Said hyperbola may have the form:

$$RSTD_i = \sqrt{(x_t - x_i)^2 + (y_t - y_i)^2}/c - \sqrt{(x_t - x_j)^2 + (y_t - y_j)^2}/c + (T_i - T_j) + (n_i - n_j),$$

where $RSTD_{i,j}$ is the reference signal time difference between a first access node denoted by index i and a second access node denoted by index j measured at the access node, $(x_t, y_t)$ are the (unknown) coordinates of the terminal device, $(x_i, y_i)$ are the (known) coordinates of the first access node, $(x_j, y_j)$ are the (known) coordinates of the second access node, $(T_i-T_1)$ is the transmit time offset between the two access nodes (i.e., a real time difference) and $(n_i-n_1)$ is the difference between terminal device measurement errors associated with the two access nodes and c is the speed of light in air (or vacuum). If the first and second positioning reference signals are transmitted at the same time (i.e., in the ideal case), the term $(T_i-T_1)$ is zero.

Additionally or alternatively to the processes relating to enabling calculation of the position of the terminal device by the LMF (i.e., elements 519 to 523), the position of the terminal device may be calculated locally by the terminal device itself. To this end, the terminal device calculates, in block 524, the position of the terminal device based on at least on the adjusted RSTD calculated in block 518 according to OTDOA positioning principles. The calculation in block 524 may be carried out as discussed above for the calculation in block 523. At least one other adjusted RSTD calculated before or after block 518 may be used in said calculation, as discussed above. The calculation in block 524 may be further based on known locations of the serving and neighboring access nodes. The calculated position of the terminal device may be displayed to a user of the terminal device via a display of the terminal device (e.g., using a dedicated positioning or map application installed to the terminal device) and/or information on the position of the terminal device may be transmitted, by the terminal device, to the serving access node of the terminal device. It should be emphasized that the two processes discussed in connection with elements 519 to 523 and with block 524 may be considered alternatives to each other, i.e., elements 519 to 523 or block 524 may be omitted from the procedure.

Figure 6A:
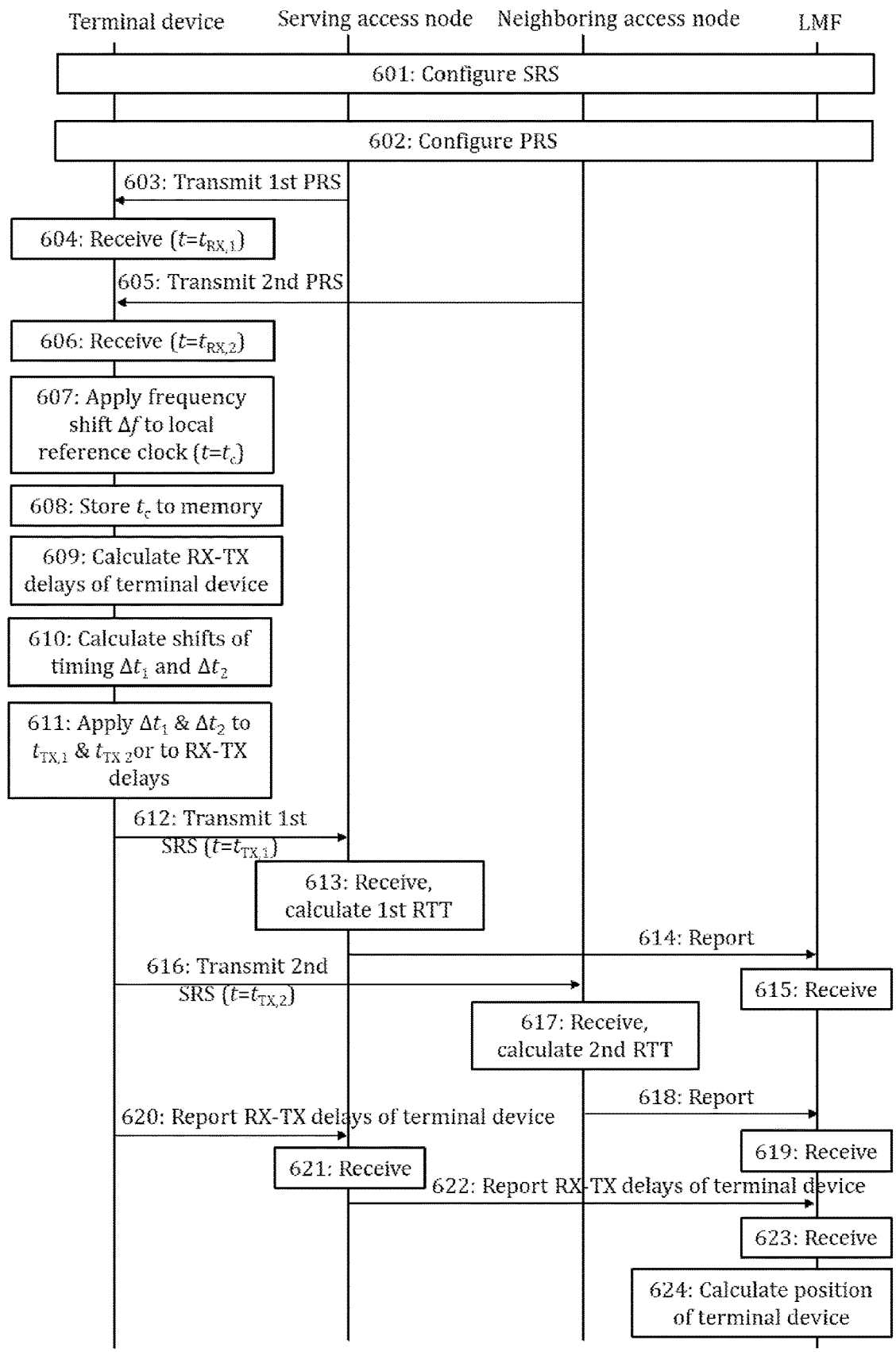

FIG. 6A illustrates processes according to embodiments for adjusting transmission timing in a terminal device to take into account any local frequency reference adjustments in connection with a multi-round-trip time (multi-RTT) positioning. FIG. 6A illustrates, similar to FIGS. 4 and 5, functionalities of a terminal device, a serving access node of a radio access network (RAN) for the terminal device, a neighboring access node of the RAN (being specifically neighboring to said serving access node) and a location management function (LMF) and signaling between them. The terminal device may correspond to either of terminal devices 100, 102 of FIG. 1. The serving and/or neighboring access node may correspond to the access node 104 of FIG. 1. In some embodiments, the functionalities of the terminal device and the access nodes may be carried out by a certain subunit of the terminal device and the corresponding access node, respectively. The serving and neighboring access nodes may be synchronized to the same clock reference.

As described in connection with above embodiments, the terminal device comprises a local reference clock which may be synchronized with a reference clock of the serving access node. The local reference clocks may be based on, for example, free-running crystal oscillators as described above. Specifically, the terminal device may comprise a phase-locked loop 200 used for deriving a reference clock signal as discussed in connection with FIG. 2.

Referring to FIG. 6A, the illustrated procedure starts with configuration, in block 601, of first and second sounding reference signals to be transmitted from the terminal device and to the serving and neighboring access nodes and the configuration, in block 602, of first and second positioning reference signals to be transmitted from the serving and neighboring access nodes to the terminal device. The configuration of SRS resources for the terminal device and the serving and neighboring access node in element 601 may be carried out as described in connection with elements 401 to 408 of FIG. 4 while the configuration of PRS resources for the terminal device and the serving and neighboring access node in element 602 may be carried out as described in connection with elements 501 to 510 of FIG. 5. In some embodiments, some of the steps relating to elements 401 to 408 of FIG. 4 and elements 501 to 510 of FIG. 5 may be combined. For example, a single (multi-RTT) positioning request may be transmitted, as opposed to two separate positioning requests relating to SRS configuration and PRS configuration as illustrated with messages 401 and 501 of FIGS. 4 and 5, respectively. Additionally or alternatively, the terminal device may receive, in blocks 601, 602, from the serving access node of the terminal device, a single configuration message (as opposed to multiple configuration messages) defining both positioning and sounding reference signal resources at least for the receiving of the first positioning reference signal and the transmitting of the first sounding reference signals and/or for the receiving of the second positioning reference signal and the transmitting of the second sounding reference signals and configure itself according to the configuration message.

In some embodiments, the configuration in blocks 601, 602 may be omitted (e.g., it may be assumed to have been carried out previously).

Following the configuration in block 601, 602, the serving access node transmits, in message 603, a first positioning reference signal (PRS) to the terminal device. The terminal device receives, in block 604, the first positioning reference signal at a first reception time instance $t_{RX,1}$ measured according to a local reference clock of the terminal device. Moreover, the neighboring access node transmits, in message 605, a second positioning reference signal to the terminal device. The terminal device receives, in block 606, the second positioning reference signal at a second reception time instance $t_{RX,2}$ measured according to a local reference clock of the terminal device.

The terminal device applies, in block 607, a frequency shift $\Delta f$ to a frequency of the local reference clock at a frequency-shift time instance $t_c$ (defined according to the local reference clock). The frequency-shift time instance $t_c$ follows the first and second reception time instances $t_{RX,1}$ and $t_{RX,2}$, as illustrated in FIG. 6A. The terminal device may store (or log), in block 608, at least the frequency-shift time instance $t_c$ to a memory of the terminal device. The terminal device may also store to the memory any of the frequency shift $\Delta f$ and first and second reception time instances $t_{RX,1}$ and $t_{RX,2}$.

The terminal device calculates, in block 609, a first reception-transmission (RX-TX) delay of the terminal device for the first reception time instance $t_{RX,1}$ and a first transmission time instance $t_{TX,1}$ scheduled, using the local reference clock of the terminal device, for the upcoming transmission of the first sounding reference signal and a second RX-TX delay of the terminal device for a second reception time instance $t_{RX,2}$ and a second transmission time instance $t_{TX,2}$ scheduled, using the local reference clock of the terminal device, for the upcoming transmission of the second sounding reference signal. The first and second RX-TX delays may be stored to a memory of the terminal device.

The terminal device calculates, in block 610, a first shift of timing $\Delta t_1$ to compensate for the frequency shift $\Delta f$ based on the first reception time instance $t_{RX,1}$, the first transmission time instance $t_{TX,1}$, the frequency shift $\Delta f$ and the frequency-shift time instance $t_c$ (or on at least some of them). In some embodiments, the first reception time instance $t_{RX,1}$ may not be used in this calculation in block 610. Moreover, the terminal device calculates, in block 610, a second shift of timing $\Delta t_2$ to compensate for the frequency shift $\Delta f$ based on the second reception time instance $t_{RX,2}$, the second transmission time instance $t_{TX,2}$, the frequency shift $\Delta f$ and the frequency-shift time instance $t_c$ (or on at least some of them). In some embodiments, the second reception time instance $t_{RX,2}$ may not be used in this calculation in block 610. The first and second shifts of timing $\Delta t_1$ & $\Delta t_2$ may be stored to a memory of the terminal device.

The terminal device applies, in block 611, the first shift of timing $\Delta t_1$ to either the first transmission time instance $t_{TX,1}$ or the first RX-TX delay of the terminal device. Correspondingly, the terminal device applies, in block 611, the second shift of transmission timing $\Delta t_2$ to either the second transmission time instance $t_{TX,2}$ or the second RX-TX delay of the terminal device.

The terminal device transmits, in message 612, the first sounding reference signal at the first transmission time instance $t_{TX,1}$ to the serving access node. Here, the first transmission time instance may have or may not have a shifted value, depending on how the first shift of timing has been applied in block 611.

The serving access node receives, in block 613, the first sounding reference signal and calculates, also in block 613, a first round-trip time between the transmission of the first positioning reference signal (message 603) and the reception of the first sounding reference signal (message 613). If the first shift of timing $\Delta t_1$ was applied on the first transmission time instance $t_{TX,1}$ to compensate for the frequency shift $\Delta f$ in block 611, the calculated first round-trip time is also implicitly compensated for the frequency shift $\Delta f$. However, if the first shift of timing $\Delta t_1$ was applied on the first RX-TX delay of the terminal device in block 611, the compensation for the frequency shift $\Delta f$ is to be carried out later in connection with block 624 based on the adjusted first RX-TX delay of the terminal device. The serving access node transmits, in message 614, a first report comprising at least the calculated first RTT to the LMF. The LMF receives, in block 615, the first report comprising at least first RTT.

A similar procedure is repeated for the second sounding reference signal in elements 616 to 619. Namely, the terminal device transmits, in message 616, the second sounding reference signal at the second transmission time instance to the neighboring access node. Here, the second transmission time instance may have or may not have a shifted value, depending on how the second shift of timing has been applied in block 611. The neighboring access node receives, in block 617, the second sounding reference signal and calculates, also in block 617, a second round-trip time between the transmission of the second positioning reference signal (message 605) and the reception of the second sounding reference signal (message 617). If the second shift of timing $\Delta t_2$ was applied on the second transmission time instance $t_{TX,2}$ to compensate for the frequency shift $\Delta f$ in block 611, the calculated second round-trip time is also implicitly compensated for the frequency shift $\Delta f$. However, if the second shift of timing $\Delta t_2$ was applied on the second RX-TX delay of the terminal device in block 611, the compensation for the frequency shift $\Delta f$ still has to be carried out later in connection with block 624 based on the adjusted first RX-TX delay of the terminal device. The neighboring access node transmits, in message 618, a second report comprising at least the calculated second RTT to the LMF. The LMF receives, in block 619, the second report comprising at least the second RTT.

The terminal device transmits, in message 620, a third report comprising the first and second RX-TX delays to the serving access node. The third report may optionally also comprise one or more of the following: the first and second reception time instances $t_{RX,1}$ & $t_{RX,2}$, the first and second transmission time instances $t_{TX,1}$ & $t_{TX,2}$, the frequency shift $\Delta f$, the frequency-shift time instance $t_c$, first and second shifts of timing $\Delta t_1$ & $\Delta t_2$ and information on whether the first and second shifts of timing were applied, respectively, to the first and second transmission time instances $t_{TX,1}$ & $t_{TX,2}$ or to the first and second RX-TX delays. In some embodiments, the third report may be transmitted to another access node such as the neighboring access node. It should be noted that the first and second RX-TX delays included in the third report may correspond to the first and second RX-TX delays of the terminal device as calculated in block 609 or, if the first and second shifts of timing $\Delta t_1$ and $\Delta t_2$ were applied, respectively, on the first and second RX-TX delay of the terminal device in block 611, to adjusted first and second RX-TX delays. Upon receiving the third report in block 621, the serving access node (or said another access node) transmits, in message 622, a fourth report comprising the first and second RX-TX delays to the LMF.

In response to receiving the fourth report in block 623, the LMF calculates, in block 624, the position of the terminal device based on the first and second RTTs and the first and second RX-TX delays of the terminal device. Similar to as described in connection with above embodiments, also this calculation may be further based on the fact that the locations of the serving access node and the neighboring access node are known to the LMF (and the fact that speed at which electromagnetic waves propagate through air, i.e., speed of light in air is known).

Figure 6B:
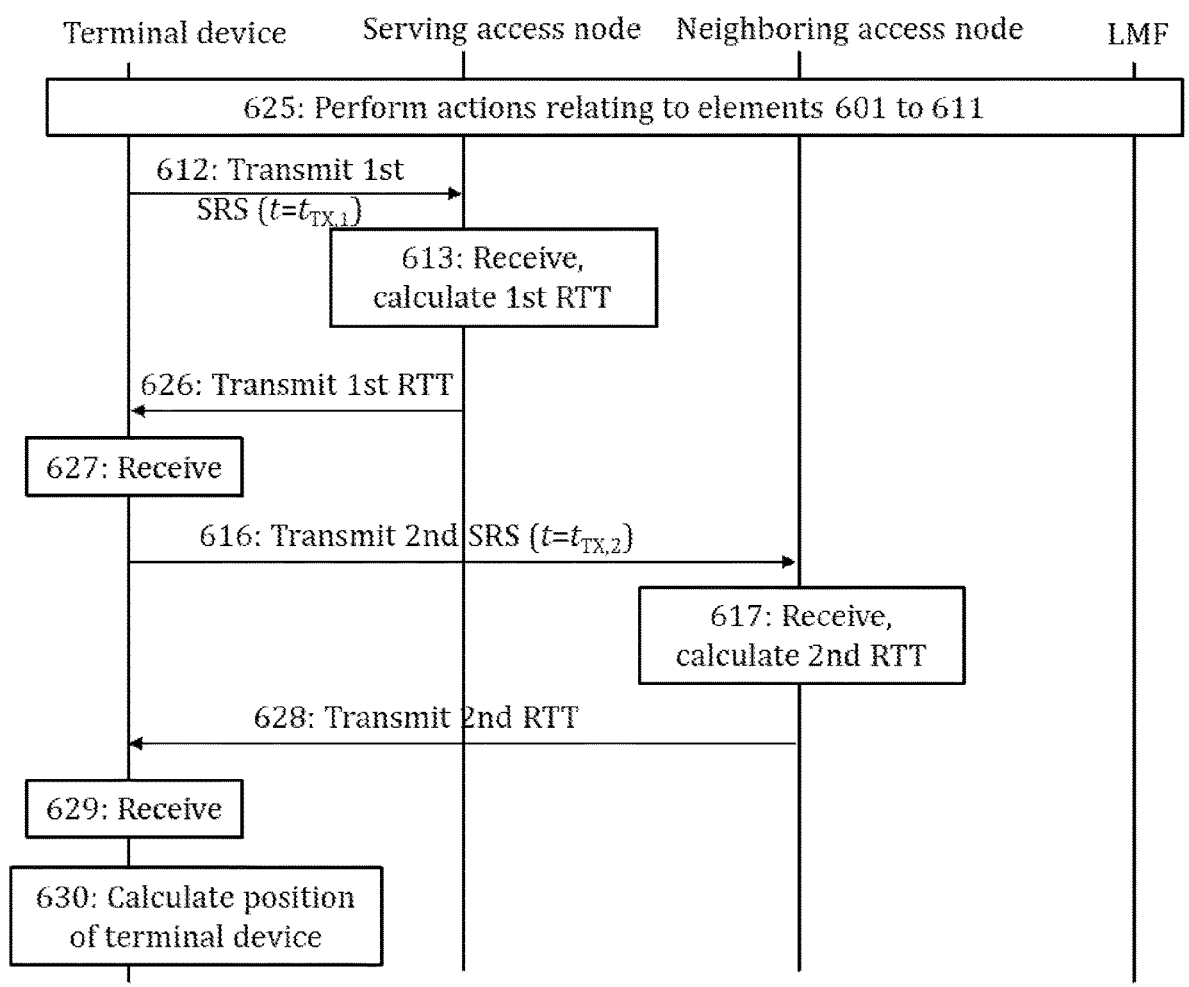

While, in FIG. 6A, the positioning of the terminal device was carried out by the LMF, in other embodiments, the positioning of the terminal device may be carried out, additionally or alternatively, locally by the terminal device. FIG. 6B illustrates processes according to embodiments for performing (multi-RTT) positioning locally by the terminal device itself. FIG. 6B corresponds to a large extent to FIG. 6B and any of the definitions provided in connection with FIG. 6A apply, mutatis mutandis, for FIG. 6B.

Referring to FIG. 6B, the initial actions carried out by the terminal device, the serving access node, neighboring access node and the LMF in block 625 may correspond to fully to actions described in connection element 601 to 611 of FIG. 6A. Also similar to FIG. 6A, the terminal device transmits, in message 612, a first sounding reference signal at a first transmission time instance measured using the local reference clock of the terminal device and the serving access node receives, in block 613, said first sounding reference signal and calculates, also in block 613, a first round-trip time between the transmission of the first positioning reference signal and the reception of the first sounding reference signal. Instead of (or in addition to) transmitting information on the first RTT to the LMF, the serving access node transmits, in message 626, information on the first RTT back to the terminal device. The terminal device receives, in block 627, said information on the first RTT (and stores said information to a memory). Same operation is repeated, mutatis mutandis, for the second sounding reference signal and the second RTT calculated based thereon in elements 616, 617, 628, 629. Following the reception of the information on the first and second RTTs in blocks 627, 629, the terminal device calculates, in block 630, a position of the terminal device based on the first and second RTTs and the first and second RX-TX delays of the terminal device (and known locations of the serving access node and the neighboring access node). This calculation may be carried out similar to the calculation in block 624 of FIG. 6A (though the entity performing the calculation is obviously different). The calculated position of the terminal device may be displayed to a user of the terminal device via a display of the terminal device (e.g., using a dedicated positioning or map application installed to the terminal device) and/or information on the position of the terminal device may be transmitted, by the terminal device, to the serving access node of the terminal device.

While FIGS. 6A and 6B illustrate multi-RTT positioning procedures involving a serving access node and a single neighboring access node, in other embodiments, the multi-RTT positioning may involve a serving access node and a plurality of neighboring access nodes. The multi-RTT procedure for the plurality of neighboring access nodes may be carried out in a similar manner as illustrated in FIG. 6A or 6B for the single neighboring access node.

While FIGS. 6A and 6B illustrate multi-RTT positioning procedures where two different access nodes are configured to transmit respective positioning reference signals to the terminal device at different times, it should be noted that in other embodiments, only one of the first and second positioning reference signals may be configured by the LMF and subsequently transmitted by the serving or neighboring access node and received by the terminal device. Correspondingly, only one of the first and second sounding reference signal may be transmitted by the terminal device and subsequently received and used for calculating a RTT. For example, in some embodiments, elements 605, 606, 616 to 619 of FIG. 6A may be omitted and the elements 609 to 611, 620 to 624 of FIG. 6A may be modified to correspond only to the first positioning or sounding reference signal or to any quantities derived therefrom (e.g., first RX-TX delay and/or a first shift of timing). The same applies, mutatis mutandis, for the process of FIG. 6B.

Different terminal devices with or without the reference clock adjustment compensation capability according to any of the above embodiments may have different accuracies reported with similar quality metrics. To create awareness at the network side, the terminal device may report its capability to a serving access node (or other access node) to compensate. This may be done, e.g., as a part of general terminal device capability reporting. In other words, the terminal device according to embodiments may be configured to report, to the (serving) access node of the terminal device, capability of the terminal device of being able to apply the shift of transmission timing (e.g., in the first process of FIG. 3 or the embodiment of FIG. 4), the shift of reception timing (e.g., in the second process of FIG. 3 or the embodiment of FIG. 5) or the shift of timing (e.g., in the embodiments of FIGS. 6A and 6B) for compensating for the frequency shift of the local reference clock. In the last case, the report may comprise information on which type of compensation is carried out (namely, adjustment of the transmission timing or adjustment of the RX-TX delay as described in connection with block 611 of FIG. 6A). The embodiments discussed above may provide at least some of the following advantages or technical effects. The solutions according to embodiments may enable increasing the accuracy of any terminal device positioning scheme impacted by frequency updates of the local reference clock of the terminal device in-between any two measurements and/or transmissions for which the relative timing impacts the position estimation accuracy.

While above embodiments were discussed using positioning reference signals as downlink reference signals for positioning and sounding reference signals as uplink reference signals for positioning, in other embodiments, different types of downlink and/or uplink reference signals may be used, instead of the positioning reference signal and/or the sounding reference signal, respectively. The used downlink and uplink reference signal may be specifically any downlink and uplink reference signals suitable for positioning.

The blocks, related functions, and information exchanges described above by means of FIGS. 2 to 5, 6A and 6B are in no absolute chronological order, and some of them may be performed simultaneously or in an order differing from the given one. In some embodiments, some of the steps may be neglected, for example, if the relevant information (e.g., a configuration) is already available (e.g., stored to a memory).

Figure 7:
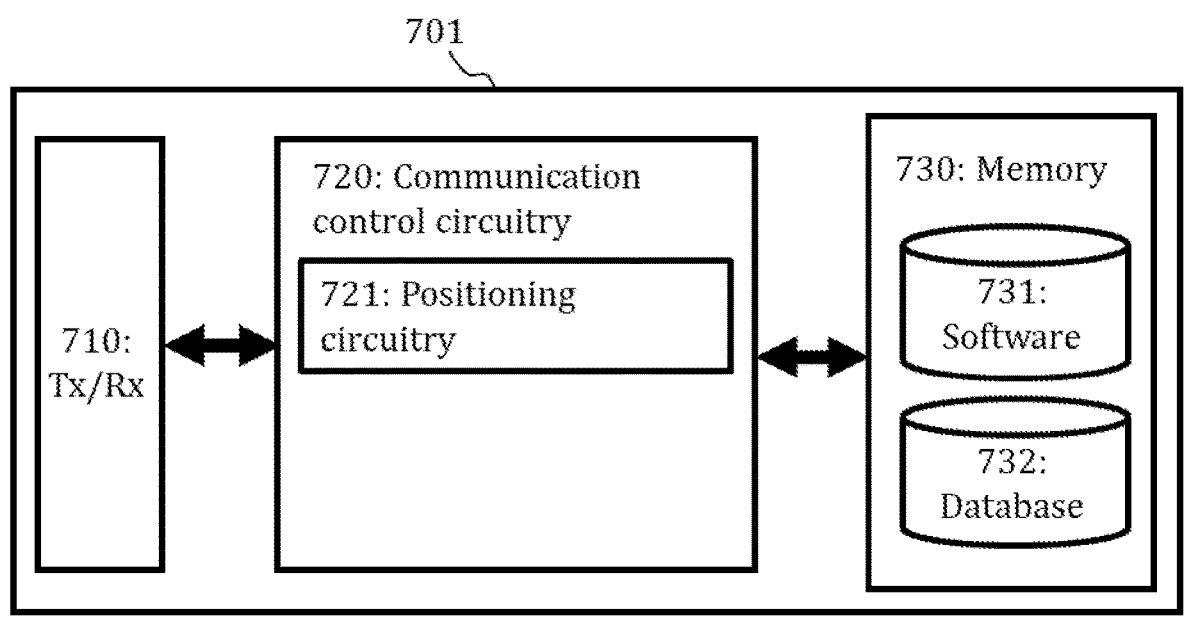
FIG. 7 illustrate an apparatus according to embodiments.

FIG. 7 illustrates an apparatus 701 configured to carry out the functions described above in connection with a terminal device such as the first and/or second terminal device shown in FIG. 3 and/or the terminal device of any of FIGS. 4 to 5, 6A and 6B. The apparatus may be an electronic device comprising electronic circuitries. The apparatus may be a separate network entity or a plurality of separate entities. The apparatus may comprise a communication control circuitry 720, such as at least one processor, and at least one memory 730 including a computer program code (software) 731 wherein the at least one memory and the computer program code (software) are configured, with the at least one processor, to cause the apparatus to carry out any one of the embodiments of the relay node described above. In some embodiments, the apparatus 701 may comprise the phase-locked loop of FIG. 2.

The memory 730 may comprise a database 732 which may comprise information, for example, on SRS and/or PRS configurations, (shifted) transmission time instances (i.e., TODs), (shifted) reception time instances (i.e., TOAs), frequency shifts, frequency-shift time instances, shifts of transmission, reception or other timing, as described in previous embodiments. The memory 730 may also comprise other databases which may not be related to the described functionalities according to embodiments.

The memory 730 of the apparatus 710 may be implemented using any suitable data storage technology, such as semiconductor based memory devices, flash memory, magnetic memory devices and systems, optical memory devices and systems, fixed memory and removable memory.

Referring to FIG. 7, the communication control circuitry 720 may comprise positioning circuitry 721. The positioning circuitry 721 may be configured, for example, to carry out at least some of actions pertaining to elements 301 to 305, 309 to 315 of FIG. 5, elements 404, 409, 413 to 417 of FIG. 4, elements 504, 510, 512 to 514, 516 to 519 of FIG. 5, elements 604, 610, 612 to 618, 622, 626 of FIG. 6A and/or elements 612, 627, 616, 629, 630 of FIG. 6B.

The apparatus 701 may further comprise communication interfaces (Tx/Rx) 710 comprising hardware and/or software for realizing communication connectivity according to one or more communication protocols. The communication interface may provide the apparatus with communication capabilities to communicate in the cellular communication system and enable communication, for example, with network nodes and terminal devices. The communication interface 710 may comprise standard well-known components such as an amplifier, filter, frequency-converter, (de)modulator, and encoder/decoder circuitries and one or more antennas. The communication interface 710 may comprise radio interface components providing the apparatus with radio communication capability in the cell.

As used in this application, the term "circuitry may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 3 to 5, 6A and 6B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 5, 6A and 6B or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

According to an embodiment, there is provided an apparatus for a first terminal device, the apparatus comprising means for performing:

transmitting a first uplink reference signal at a first transmission time instance measured according to a local reference clock of the first terminal device;

applying a frequency shift to a frequency of the local reference clock at a frequency-shift time instance measured according to the local reference clock and following the first transmission time instance;

calculating a shift of transmission timing for an upcoming transmission of a second uplink reference signal to compensate for the frequency shift based on a second transmission time instance scheduled using the local reference clock for the upcoming transmission of the second uplink reference signal, the frequency shift and the frequency-shift time instance;

applying the shift of transmission timing to the second transmission time instance; and transmitting the second uplink reference signal at the second time instance following the shift of transmission timing.

According to an embodiment, there is provided an apparatus for a second terminal device, the apparatus comprising means for performing:

receiving a first downlink reference signal at a first reception time instance measured according to a local reference clock of the second terminal device;

applying a frequency shift to a frequency of the local reference clock at a frequency-shift time instance, wherein the frequency-shift time instance is defined according to the local reference clock and follows the first reception time instance;

receiving a second downlink reference signal at a second reception time instance measured according to the local reference clock;

calculating a shift of reception timing for the reception of the second downlink reference signal to compensate for the frequency shift based on the frequency shift, the frequency-shift time instance and the second reception time instance;

calculating an adjusted reference signal time difference based on the first reception time instance, the second reception time instance and the shift of reception timing; and performing at least one of
reporting the adjusted reference signal time difference to a serving access node and
calculating a position of the second terminal device based at least on the adjusted reference signal time difference according to observed time difference of arrival positioning principles.

According to an embodiment, there is provided an apparatus for a third terminal device, the apparatus comprising means for performing:

receiving a first downlink reference signal at a first reception time instance measured according to a local reference clock of the third terminal device from a first access node;

applying a frequency shift to a frequency of the local reference clock at a frequency-shift time instance, wherein the frequency-shift time instance is measured according to the local reference clock and follows the first reception time instances;

calculating a first reception-transmission delay of the terminal device between the first reception time instance and a first transmission time instance scheduled for transmission of a first uplink reference signal;

calculating a first shift of timing to compensate for the frequency shift based on the first transmission time instance, the frequency shift and the frequency-shift time instance;

applying the first shift of timing to one of the first transmission time instance and the first reception-transmission delay;

transmitting the first uplink reference signal at the first transmission time instance to the first access node; and performing at least one of
reporting the first reception-transmission delay to at least one of the first access node and a second access node and
receiving information on a first round-trip time calculated based on a transmission of the first downlink reference signal and reception of the first uplink reference signal from the first access node and estimating a position of the third terminal device based at least on the first round-trip time and the first reception-transmission delay.

Embodiments as described may also be carried out in the form of a computer process defined by a computer program or portions thereof. Embodiments of the methods described in connection with FIGS. 3 to 5, 6A and 6B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

According to an embodiment, there is provided a computer program comprising instructions or a computer readable medium comprising program instructions or a non-transitory computer readable medium comprising program instructions for causing an apparatus (e.g., a first terminal device or a part thereof) to perform at least the following:

transmitting a first uplink reference signal at a first transmission time instance measured according to a local reference clock of a first terminal device;

applying a frequency shift to a frequency of the local reference clock at a frequency-shift time instance measured according to the local reference clock and following the first time instance;

calculating a shift of transmission timing for an upcoming transmission of a second uplink reference signal to compensate for the frequency shift based on a second transmission time instance scheduled using the local reference clock for the upcoming transmission of the second uplink reference signal, the frequency shift and the frequency-shift time instance;

applying the shift of transmission timing to the second transmission time instance; and transmitting the second uplink reference signal at the second time instance following the shift of transmission timing.

According to an embodiment, there is provided a computer program comprising instructions stored thereon for performing at least the steps listed above (i.e., in connection with the preceding embodiment).

According to an embodiment, there is provided a computer program comprising instructions or a computer readable medium comprising program instructions or a non-transitory computer readable medium comprising program instructions for causing an apparatus (e.g., a second terminal device or a part thereof) to perform at least the following:
receiving a first downlink reference signal at a first reception time instance measured according to a local reference clock of a second terminal device;
applying a frequency shift to a frequency of the local reference clock at a frequency-shift time instance, wherein the frequency-shift time instance is defined according to the local reference clock and follows the first reception time instance;
receiving a second downlink reference signal at a second reception time instance measured according to the local reference clock;
calculating a shift of reception timing for the reception of the second downlink reference signal to compensate for the frequency shift based on the frequency shift, the frequency-shift time instance and the second reception time instance;
calculating an adjusted reference signal time difference based on the first reception time instance, the second reception time instance and the shift of reception timing; and
performing at least one of
reporting the adjusted reference signal time difference to a serving access node and
calculating a position of the second terminal device based at least on the adjusted reference signal time difference according to observed time difference of arrival positioning principles.

According to an embodiment, there is provided a computer program comprising instructions stored thereon for performing at least the steps listed above (i.e., in connection with the preceding embodiment).

According to an embodiment, there is provided a computer program comprising instructions or a computer readable medium comprising program instructions or a non-transitory computer readable medium comprising program instructions for causing an apparatus (e.g., a third terminal device or a part thereof) to perform at least the following:
receiving a first downlink reference signal at a first reception time instance measured according to a local reference clock of a third terminal device from a first access node;
applying a frequency shift to a frequency of the local reference clock at a frequency-shift time instance, wherein the frequency-shift time instance is measured according to the local reference clock and follows the first reception time instances;
calculating a first reception-transmission delay of the terminal device between the first reception time instance and a first transmission time instance scheduled for transmission of a first uplink reference signal;
calculating a first shift of timing to compensate for the frequency shift based on the first transmission time instance, the frequency shift and the frequency-shift time instance;
applying the first shift of timing to one of the first transmission time instance and the first reception-transmission delay;
transmitting the first uplink reference signal at the first transmission time instance to the first access node; and
performing at least one of
reporting the first reception-transmission delay to at least one of the first access node and a second access node and
receiving information on a first round-trip time calculated based on a transmission of the first downlink reference signal and reception of the first uplink reference signal from the first access node and estimating a position of the third terminal device based at least on the first round-trip time and the first reception-transmission delay.

According to an embodiment, there is provided a computer program comprising instructions stored thereon for performing at least the steps listed above (i.e., in connection with the preceding embodiment).

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor; and
at least one memory storing instructions that, when executed by said at least one processor, cause the apparatus to perform:
transmitting a first uplink reference signal at a first transmission time instance measured according to a local reference clock of a first terminal device;
applying a frequency shift to a frequency of the local reference clock at a frequency-shift time instance measured according to the local reference clock and following the first transmission time instance;
calculating a shift of transmission timing for an upcoming transmission of a second uplink reference signal to compensate for the frequency shift based on a second transmission time instance scheduled using the local reference clock for the upcoming transmission of the second uplink reference signal, the frequency shift and the frequency-shift time instance;
applying the shift of transmission timing to the second transmission time instance; and
transmitting the second uplink reference signal at the second transmission time instance following the shift of transmission timing.

2. The apparatus of claim 1, wherein the at least one memory storing instructions that, when executed by the at least one processor, cause the apparatus further to perform:
calculating the shift of transmission timing further based on the first transmission time instance.

3. The apparatus according to claim 2, wherein the at least one memory storing instructions that, when executed by the at least one processor, cause the apparatus to perform the transmitting of the first uplink reference signal to at least one first access node and/or the transmitting of the second uplink reference signal to said at least one first access node and/or at least one second access node.

4. The apparatus according to claim 2, wherein the first terminal device is configured for beamforming in transmission using one or more antenna arrays and the at least one memory storing instructions that, when executed by the at least one processor, to cause the apparatus to perform the transmitting of the first uplink reference signal to a first access node using a first beam and to perform the transmitting of the second uplink reference signal to at least one of the first access node and a second access node using a second beam.

5. The apparatus according to claim 2, wherein the at least one memory storing instructions that, when executed by the at least one processor, cause the apparatus to perform, before the transmitting of the first uplink reference signal:
receiving, from a serving access node, a configuration message defining uplink reference signal resources at least for the transmitting of the first and second uplink reference signals; and
configuring the first terminal device according to the configuration message.

6. The apparatus of claim 1, wherein the at least one memory storing instructions that, when executed by the at least one processor, cause the apparatus further to perform:
reporting, to a serving access node, capability of the first terminal device of being able to apply the shift of transmission timing for compensating for the frequency shift of the local reference clock.

7. The apparatus according to claim 1, wherein any uplink reference signals are at least one of the following: sounding reference signals or any downlink reference signals are positioning reference signals.

8. A method comprising:
transmitting a first uplink reference signal at a first transmission time instance measured according to a local reference clock of a first terminal device;
applying a frequency shift to a frequency of the local reference clock at a frequency-shift time instance measured according to the local reference clock and following the first transmission time instance;
calculating a shift of transmission timing for an upcoming transmission of a second uplink reference signal to compensate for the frequency shift based on a second transmission time instance scheduled using the local reference clock for the upcoming transmission of the second uplink reference signal, the frequency shift and the frequency-shift time instance;
applying the shift of transmission timing to the second transmission time instance; and
transmitting the second uplink reference signal at the second transmission time instance following the shift of transmission timing.

9. The method of claim 8, wherein the calculating the shift of transmission timing is further based on the first transmission time instance.

10. The method according to claim 9, wherein the first uplink reference signal is transmitted to at least one first access node and/or the second uplink reference signal is transmitted to said at least one first access node and/or at least one second access node.

11. The method according to claim 9, wherein the first terminal device is configured for beamforming in transmission using one or more antenna arrays, the first uplink reference signal is transmitted to a first access node using a first beam, and the second uplink reference signal is transmitted to at least one of the first access node and a second access node using a second beam.

12. The method according to claim 9, wherein the method further comprises, before the transmitting of the first uplink reference signal:
receiving, from a serving access node, a configuration message defining uplink reference signal resources at least for the transmitting of the first and second uplink reference signals; and
configuring the first terminal device according to the configuration message.

13. The non-transitory computer readable medium according to claim 9, wherein the first uplink reference signal is transmitted to at least one first access node and/or the second uplink reference signal is transmitted to said at least one first access node and/or at least one second access node.

14. The non-transitory computer readable medium according to claim 9, wherein the first terminal device is configured for beamforming in transmission using one or more antenna arrays, the first uplink reference signal is transmitted to a first access node using a first beam and the second uplink reference signal is transmitted to at least one of the first access node and a second access node using a second beam.

15. The non-transitory computer readable medium according to claim 9, wherein the program instructions, when executed by the apparatus, cause the apparatus to further perform, before the transmitting of the first uplink reference signal:
receiving, from a serving access node, a configuration message defining uplink reference signal resources at least for the transmitting of the first and second uplink reference signals; and
configuring the first terminal device according to the configuration message.

16. The method of claim 8, wherein the method further comprises:
reporting, to a serving access node, capability of the first terminal device of being able to apply the shift of transmission timing for compensating for the frequency shift of the local reference clock.

17. A non-transitory computer readable medium comprising program instructions that, when executed by an apparatus, cause the apparatus to perform at least the following:
transmitting a first uplink reference signal at a first transmission time instance measured according to a local reference clock of a first terminal device;
applying a frequency shift to a frequency of the local reference clock at a frequency-shift time instance measured according to the local reference clock and following the first transmission time instance;
calculating a shift of transmission timing for an upcoming transmission of a second uplink reference signal to compensate for the frequency shift based on a second transmission time instance scheduled using the local reference clock for the upcoming transmission of the second uplink reference signal, the frequency shift and the frequency-shift time instance;
applying the shift of transmission timing to the second transmission time instance; and
transmitting the second uplink reference signal at the second transmission time instance following the shift of transmission timing.

18. The non-transitory computer readable medium of claim 17, wherein the shift of transmission timing is further based on the first transmission time instance.

19. The non-transitory computer readable medium of claim 17, wherein the program instructions, when executed by the apparatus, cause the apparatus to further perform:
reporting, to a serving access node, capability of the first terminal device of being able to apply the shift of transmission timing for compensating for the frequency shift of the local reference clock.

* * * * *